Jan. 10, 1956     L. A. JAMES ET AL     2,730,384
SLEEVE COMPRESSED RESILIENT SOCKET COUPLING
Filed March 1, 1952     2 Sheets-Sheet 1
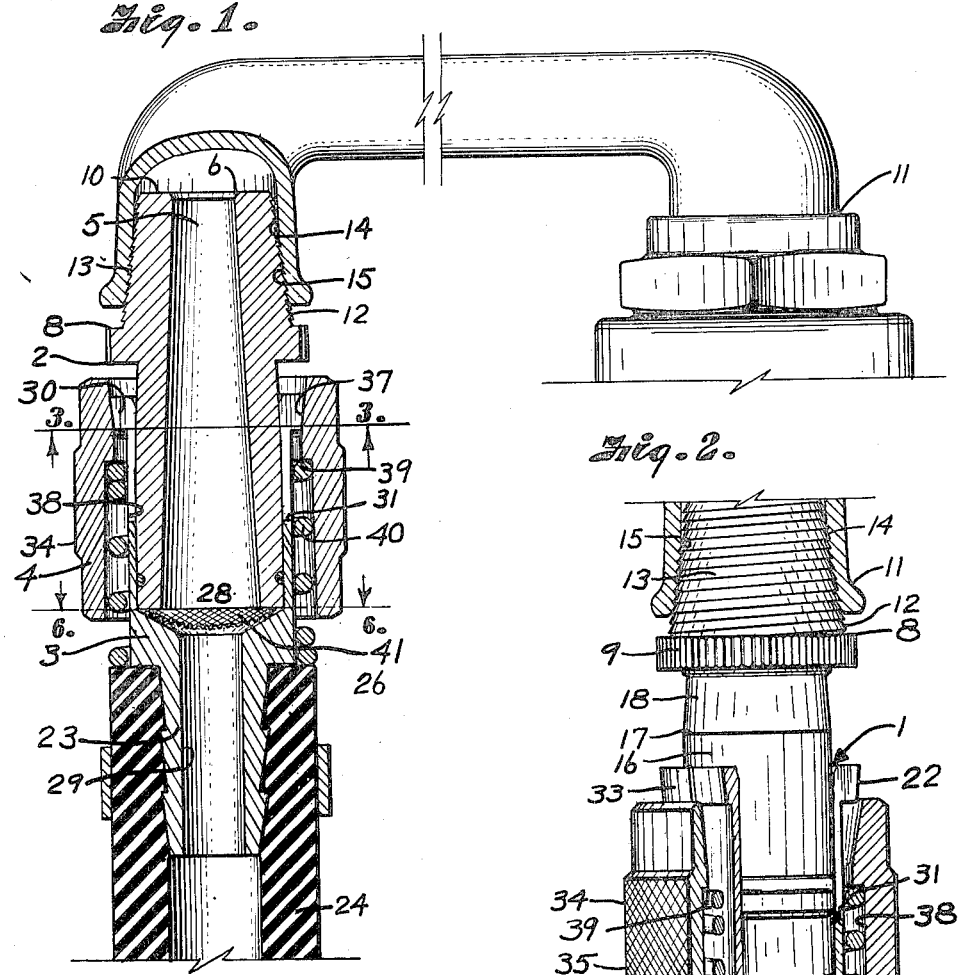
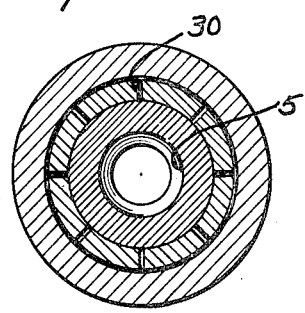
INVENTOR.
Lewis A. James and
BY Duane A. James.
Fishburn & Mullendore
ATTORNEYS.

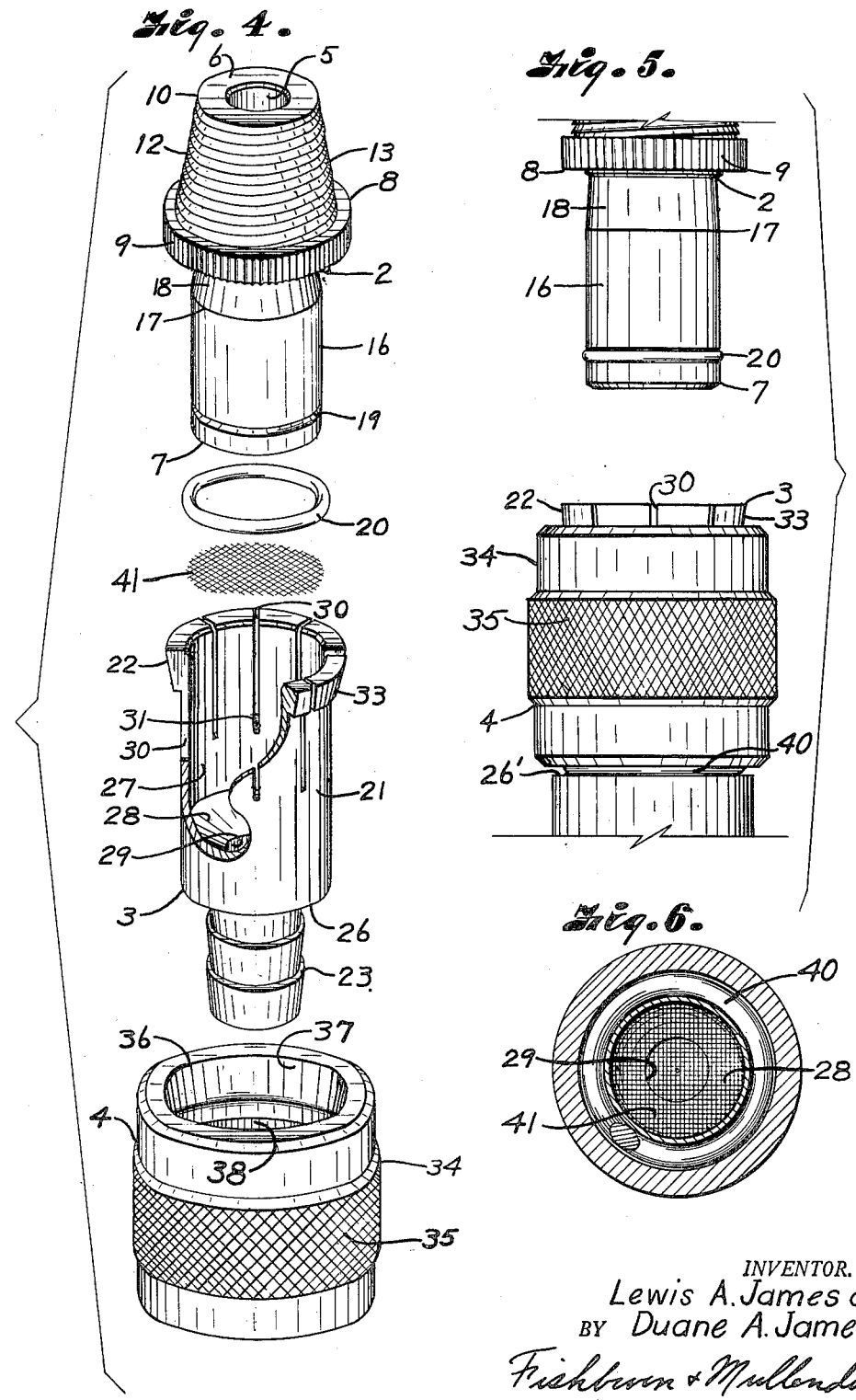

United States Patent Office 2,730,384
Patented Jan. 10, 1956

2,730,384

SLEEVE COMPRESSED RESILIENT SOCKET COUPLING

Lewis A. James and Duane A. James, Independence, Kans., assignors, by mesne assignments, to Cribben and Sexton Company, Chicago, Ill., a corporation of Illinois Application March 1, 1952, Serial No. 274,392

3 Claims. (Cl. 285—161)

This invention relates to quickly detachable hose couplers and faucet adapters, and more particularly to a coupling structure of few parts having a positive connection with a high degree of sealing efficiency capable of handling a supply of hot water to household dishwashing machines and the like.

The objects of the invention are to provide a quickly detachable coupling which will not separate except upon manual intervention; to provide male and female members of a detachable coupling with sleeve-actuated, cooperating, tapered surfaces for securing said members together; to provide a coupling structure which releases the trapped pressure and deflects flow therethrough as the members are disconnected; to provide readily replaceable seal means in a quickly detachable coupling which may be quickly and easily replaced to provide an efficient seal; to provide a quickly detachable coupling having a hardened, tapered, threaded portion on one member for screwing into the outlet opening of a faucet to adapt said faucet for the coupling; to provide a quickly detachable coupling with a minimum number of parts; and to provide a coupling which is economical to manufacture, simple in construction, easy to operate, efficient, positive in operation, and easy to assemble and attach to a faucet.

In accomplishing these and other objects of the present invention, we have provided improved details of structure, the preferred forms of which are illustrated in the accompanying drawings, wherein:

Fig. 1 is a longitudinal sectional view through the quickly detachable coupling connected to a faucet.

Fig. 2 is a side elevational view, partly in section, of the coupling with the members partially separated.

Fig. 3 is a transverse sectional view through the coupling on the line 3—3, Fig. 1.

Fig. 4 is a detail perspective view of the parts of the coupling in spaced, disassembled relation.

Fig. 5 is a side elevational view of the coupling parts in detached relation.

Fig. 6 is a transverse sectional view through the coupling on the line 6—6, Fig. 1.

Referring more in detail to the drawings:

1 designates a quickly detachable coupling generally consisting of a male member 2, female member 3, and a sleeve 4. In the structure illustrated, the male member 2 is formed of metal, such as steel, and has a through axial bore 5, said bore preferably being tapered outwardly from the inlet end 6 to provide the larger portion of the bore at the outlet end 7. An annular flange 8 is arranged on the male member 2, intermediate the ends thereof, the periphery of the flange being knurled as at 9, or otherwise formed to facilitate gripping same. The portion of the male member between the annular flange 8 and the inlet end 6 is constructed to form a faucet adapter 10 for connection with a conventional type faucet 11, the faucet adapter 10 consisting of a tapered shank 12, having external threads 13 of suitable size, whereby the small or inlet end will enter the bore 14 at the outlet of the faucet and the root diameter of the threads at the large end of the adapter will be slightly larger than the bore 14. The tapered shank 12 and threads thereon are suitably hardened and shaped whereby when the adapter is screwed into the bore of the faucet, the threads 13 will cut threads 15 in said bore to secure the male member 2 to the faucet and form a liquid tight seal therebetween, as illustrated in Fig. 1.

The portion of the male member between the annular flange 8 and the outlet end 7 is an elongate connecting shank 16, circular in cross-section, with a slight inward taper from the outlet end 7 toward the annular flange, said slight taper terminating as at 17 in an increased, inwardly tapered portion 18 which extends to the annular flange 8. The lower portion of the shank 16 is provided with a groove 19 to receive a ring gasket 20 of compressible resilient material, such as rubber or the like.

The female member 3 comprises a substantially cylindrical section 21 having a radially extending flange 22 on one end thereof and a reduced diameter, exteriorly serrated extension 23 on the other end thereof for attachment of a hose 24. A conventional hose clamp 25 is arranged around the portion of the hose sleeved over the extension 23 and tightened to clamp the hose on the extension. The end of the hose preferably engages the shoulder 26 on the cylindrical portion 21 and said hose is of larger outside diameter than the cylindrical section 21 to form a shoulder 26'.

The cylindrical portion 21 is provided with a cylindrical bore 27 extending from the flanged end toward the extension 23, the bore 27 preferably being of a length substantially greater than the slightly tapered portion of the male member, but less than the length between the end 7 and the flange 8 thereof. The bore 27 terminates in an inwardly sloping portion 28 which slopes toward the bore 29 which extends through the extension 23. The bore 27 is preferably substantially the same diameter as the male member adjacent the end 7 thereof to form a relatively tight removable fit of said end of the male member in the bore 27 when said male member is inserted in the female member as illustrated in Fig. 1, said fit also being such to compress the ring gasket 20 into the groove 19 to provide an efficient seal between the male and female members.

The female member is provided with a plurality of slots 30 extending longitudinally of the flanged end and terminating as at 31, said slots having greater spacing from the sloping portion 28 than the spacing of the groove 19 from the end 7 of the male member. The slots 30 are such that inwardly directed pressure on the flange 22 will move the slotted portion of the female member inwardly and effect reduction of the diameter of same to provide a gripping action on the male member, and particularly the tapered portion 18 thereof when the male and female members are assembled as shown in Fig. 1. The periphery of the flange 22 is tapered inwardly as at 33 whereby the large portion thereof is adjacent the end of the female member, said tapered portion being opposite to the taper of the shank 16 and forming a conical wedge.

The sleeve 4 is substantially cylindrical in shape, with an enlarged central portion 34 having a knurled periphery 35. The sleeve is provided with a bore 36 preferably substantially smaller than the diameter of the smaller end of the taper 33 on the flange 22 of the female member. One end of the sleeve is provided with a tapered counterbore 37, the slope of which substantially corresponds to the tapered portion 33 of the flange 22, said counterbore preferably being of a length substantially twice the length of the taper 33 or width of the flange 22, whereby movement of the tapered counterbore 37 in engagement with the taper 33 and toward the open end of the female member compresses the slotted end of said female member to reduce the diameter thereof.

The sleeve 4 is also provided with a counterbore 38 opening from the end opposite and terminating short of the tapered counterbore 37 to form a shoulder 39. A spring 40 is sleeved on the cylindrical portion 21 with one end engaging the shoulder 39 and the other end engaging the shoulder 26' said spring urging the sleeve toward the flanged end of the female member.

In using a detachable coupling and faucet attachment constructed as described, the sleeve 4 is arranged on the female member with the tapered counterbore 37 toward the flanged end of the female member. The spring 40 is inserted into the counterbore 38 and surrounds the cylindrical portion 21. The hose 24 is sleeved over the serrated portion 23 and the clamp 25 applied to said hose in suitable position whereby the shoulder 26' engages one end of the spring 40 and when the sleeve 4 is moved to disengage the tapered counterbore 37 from the taper 33, the spring is compressed between the shoulders 26' and 39. A screen 41 preferably is arranged on the sloping portion 28 in the bore of the female member. The ring gasket 20 is moved onto the male member and seated in the groove 19. The small end of the faucet adapter portion is inserted into the opening 14 of the faucet 11 and then turned whereby the threads 13 are screwed into the faucet, cutting threads 15 therein to form a liquid tight seal. The adapter may be left in the faucet at all times.

The coupling members are attached by moving the female member to insert the end 7 of the male member into the bore 27 until said end 7 engages the end of said bore, then movement of the sleeve 4 by the spring 40 to engage the tapered counterbore 37 with the tapered portion 33 of the flange 22 will cause the flanged end of the female member to be compressed inwardly. Further movement of the sleeve 4 toward the large portion of the taper 33 will compress the flanged end of the female member into engagement with the tapered portion 18 of the male member. It is also to be noted that the slotted portion will be tightly engaged with the slightly tapered portion 16 of said male member. When so compressed the bore 27 adjacent the flanged end of the female member is substantially smaller than the other end of said bore, and the male member is larger at the end 7 thereof and is tapered to a smaller diameter toward the flange 8. The tight grip of the compressed flanged portion of the female member on the male member provides a friction between the members which tends to hold them in attached condition, and this frictional engagement, in addition to the respective tapers, provides a positive locking of the male and female members together.

After use, and when the water flow through the faucet is turned off, the coupling members are detached by moving the sleeve toward the clamp 25 to disengage the tapered counterbore 37 from the taper 33 of the female member, permitting the slotted portion of said female member to assume its normal position. Then the female member is pulled from the male member sufficiently to move the ring gasket 20 above the ends 32 of the slots 30 whereby any water trapped under pressure in the hose 24 can escape through the slots and escape through the bore of the sleeve 4 as illustrated in Fig. 2. With this arrangement the sleeve 4 serves as a deflector which prevents the water from being discharged outwardly when the coupling members are disconnected. After the water pressure is released the female member is then pulled completely from the male member to effect complete detachment of the coupling members.

While the male member has been illustrated with a faucet adapter thereon, it is believed obvious that a serrated extension could be substituted therefor whereby a hose could be connected to the male member and the quickly detachable coupling serve for attaching to hose members.

It is believed obvious that we have provided a quickly attachable and detachable coupling which is economical to manufacture, easy to assemble, and efficient in operation.

What we claim and desire to secure by Letters Patent is:

1. A detachable coupling comprising, a male member having an elongated connecting shank of circular cross section and tapered slightly inwardly from the outlet end thereof and a peripheral groove adjacent said end, a compressible gasket in said peripheral groove, a female member having a normally cylindrical bore opening from one end thereof for receiving the connecting shank of said male member, said bore substantially conforming in diameter to the outlet end of the shank of the male member, said compressible gasket engaging the female member to effect a seal between the male and female members, said female member having a plurality spaced slots extending longitudinally from the open end thereof and terminating short of the portion engaged by the compressible gasket, a sleeve surrounding the female member, and cooperating tapering surfaces on the sleeve and female member movably engaged to compress the slotted portion of the female member and the bore of the slotted portion into substantial conformity with the inwardly tapering connecting shank of the male member for locking engagement therewith.

2. A detachable coupling comprising, a male member having an elongated connecting shank of circular cross section and tapered slightly inwardly from the outlet end thereof and a peripheral groove adjacent said end, a compressible gasket in said peripheral groove, a female member having a bore which is normally cylindrical and substantially corresponding in diameter to the outlet end of the shank of the male member for receiving the connecting shank of said male member, said compressible gasket engaging in said bore of the female member to effect a seal between the male and female members, said female member having a plurality of spaced slots extending longitudinally from the open end thereof and terminating short of the portion engaged by the compressible gasket, a tapered periphery on the female member adjacent the open end thereof, the taper on the female member being opposite to the taper on the connecting shank of the male member, and a sleeve surrounding the female member and having a tapered bore movably engaging the tapered periphery of the female member to compress the slotted portion of the female member whereby the bore of said slotted portion substantially conforms to the inwardly tapering connecting shank of the male member and is lockingly engaged therewith.

3. A detachable coupling comprising, a tubular male member having an elongated connecting shank of circular cross section on the outlet end of the male member, said connecting shank being tapered slightly inwardly from the outlet end thereof and having an increasingly tapered portion remote from said outlet end, said connecting shank having a peripheral groove adjacent the outlet end thereof, a compressible gasket in said peripheral groove, a female member having means for clamping a hose on one end thereof and a normally cylindrical bore entering from the other end thereof for receiving the connecting shank of the male member, said cylindrical bore substantially corresponding in diameter to the outlet end of the shank of the male member, said compressible gasket engaging in the bore of the female member to effect a seal between the male and female members, said female member having a plurality of spaced slots extending longitudinally from the open end thereof and terminating short of the portion engaged by the compressible gasket, an annular flange on the female member adjacent the open end thereof, a tapered periphery on said annular flange and tapering in the opposite direction to the taper of the connecting shank, a sleeve surrounding the female member and having a tapered bore movably engaging the tapered periphery of the annular flange to compress the slotted portion of the female member whereby the bore of said slotted portion substantially corresponds to the inwardly tapering connecting shank of the male member and is lockingly engaged therewith, and a spring on the female member engaging the sleeve for urging said sleeve toward said annular flange.

References Cited in the file of this patent

UNITED STATES PATENTS

| | | |
|---|---|---|
| 1,315,484 | Fesler | Sept. 9, 1919 |
| 2,135,222 | Scheiwer | Nov. 1, 1938 |
| 2,075,024 | Delano | Mar. 30, 1947 |
| 2,453,741 | Bopp | Nov. 16, 1948 |
| 2,481,404 | Donner | Sept. 6, 1949 |

FOREIGN PATENTS

| | | |
|---|---|---|
| 847,163 | France | June 29, 1939 |
| 526,949 | Great Britain | Sept. 30, 1940 |